(12) United States Patent
Zulu

(10) Patent No.: US 11,122,724 B1
(45) Date of Patent: Sep. 21, 2021

(54) GROUND ENGAGING TILLER WITH INVOLUTE PROFILE

(71) Applicant: Joshua Zulu, Germantown Hills, IL (US)

(72) Inventor: Joshua Zulu, Germantown Hills, IL (US)

( * ) Notice: Subject to any disclaimer, the term of this patent is extended or adjusted under 35 U.S.C. 154(b) by 0 days.

(21) Appl. No.: 16/946,820

(22) Filed: Jul. 8, 2020

Related U.S. Application Data

(60) Provisional application No. 62/986,939, filed on Mar. 9, 2020.

(51) Int. Cl.
*A01B 33/02* (2006.01)
*A01B 33/10* (2006.01)

(52) U.S. Cl.
CPC ............ *A01B 33/103* (2013.01); *A01B 33/02* (2013.01)

(58) Field of Classification Search
CPC ....... A01B 15/16; A01B 33/103; A01B 33/00; A01B 33/02; A01B 35/16; A01B 39/08; A01B 7/00; A01B 9/00; A01B 9/003; A01B 5/00; A01B 5/16; A01B 21/04
See application file for complete search history.

(56) References Cited

U.S. PATENT DOCUMENTS

| | | | | |
|---|---|---|---|---|
| 971,218 A * | 9/1910 | Schäller | ............... | A01B 33/021 172/106 |
| 1,258,109 A * | 3/1918 | Goeldner | ............. | A01B 33/103 172/532 |
| 1,325,416 A * | 12/1919 | Scranton | ............... | A01B 33/103 172/540 |
| 1,543,515 A * | 6/1925 | Pickard | ................ | A01B 33/103 172/540 |
| 1,682,896 A * | 9/1928 | Dunham | ............... | A01B 29/041 172/537 |
| 1,699,152 A * | 1/1929 | Miller | .................. | A01B 33/103 172/549 |
| 1,827,429 A * | 10/1931 | Glasier | .................... | A01B 1/00 172/37 |
| 1,911,623 A * | 5/1933 | Karl | ....................... | A01B 35/16 172/555 |
| 1,973,309 A | 9/1934 | Glasier | | |
| 2,580,236 A * | 12/1951 | Mascaro | ................. | A01B 45/02 172/419 |
| 2,597,742 A * | 5/1952 | Mahoney | ............. | A01B 33/103 172/556 |
| 2,663,241 A * | 12/1953 | Howard | ............... | A01B 33/103 172/556 |
| 2,679,200 A | 5/1954 | Johnson | | |

(Continued)

*Primary Examiner* — Jessica H Lutz
(74) *Attorney, Agent, or Firm* — Dunlap Bennett & Ludwig, PLLC; Anna Kinney

(57) ABSTRACT

A tilling apparatus is disclosed. The tilling apparatus includes a central rotating assembly and multiple tiller blades. The tiller blades are attached to the circumference of the central rotating assembly. At least one surface of the tiller blades has an involute curve. A tilling apparatus is also disclosed including a central rotating assembly, multiple tiller blades in circumferential rows, a hitch assembly, and a frame. The central rotating assembly is mounted longitudinally on a horizontal shaft and has a fillable cavity. Each tiller blade has at least one surface with an involute curve. A ratio of the central rotating assembly's radius to a radial length of the tiller blades is at least about 1:1.

13 Claims, 4 Drawing Sheets

(56) References Cited

U.S. PATENT DOCUMENTS

| | | | |
|---|---|---|---|
| 3,012,626 A | 12/1961 | Marryatt | |
| 3,120,279 A | 2/1964 | Horowitz | |
| 3,170,522 A * | 2/1965 | Vissers | A01B 9/003 |
| | | | 172/91 |
| 3,216,508 A * | 11/1965 | Horowitz | A01B 9/003 |
| | | | 172/95 |
| 3,221,822 A * | 12/1965 | Dedoes | A01B 45/02 |
| | | | 172/22 |
| 3,415,355 A | 12/1968 | Ash | |
| 3,528,508 A * | 9/1970 | Stevenson | A01B 21/04 |
| | | | 172/554 |
| 3,650,334 A * | 3/1972 | Hagenstad | A01B 39/08 |
| | | | 172/540 |
| 3,692,120 A | 9/1972 | Cline | |
| 3,881,553 A * | 5/1975 | Angeski | A01B 1/243 |
| | | | 172/22 |
| 3,935,712 A * | 2/1976 | Erickson | E02F 5/103 |
| | | | 405/182 |
| 4,043,404 A | 8/1977 | Sorlie et al. | |
| 4,081,034 A * | 3/1978 | Hines | A01B 45/02 |
| | | | 172/22 |
| 4,279,310 A | 7/1981 | van der Lely | |
| 4,284,146 A | 8/1981 | van der Lely | |
| 4,290,488 A * | 9/1981 | Pelsy | B62D 49/0635 |
| | | | 172/123 |
| 4,298,070 A | 11/1981 | van der Lely | |
| 4,411,377 A | 10/1983 | Miksitz | |
| 4,484,389 A | 11/1984 | Kogej et al. | |
| 4,506,811 A | 3/1985 | Miksitz | |
| 4,525,987 A | 7/1985 | Werner et al. | |
| 4,720,207 A * | 1/1988 | Salani | B28D 1/186 |
| | | | 172/123 |
| 4,991,660 A | 2/1991 | Horvath et al. | |
| 5,048,616 A | 9/1991 | Hoff | |
| 5,452,766 A | 9/1995 | Imamura et al. | |
| 5,765,645 A * | 6/1998 | Postema | A01B 35/26 |
| | | | 172/21 |
| 5,782,309 A | 7/1998 | Bultman | |
| 6,092,600 A | 7/2000 | McKinzie et al. | |
| 6,092,608 A | 7/2000 | Leger | |
| 6,431,287 B1 * | 8/2002 | Ramp | A01B 33/024 |
| | | | 172/107 |
| 6,926,091 B2 | 8/2005 | Lee | |
| 7,878,260 B2 | 2/2011 | Notaras et al. | |
| 8,201,638 B1 * | 6/2012 | Badger | A01B 69/006 |
| | | | 172/145 |
| 9,516,799 B2 | 12/2016 | Olsen | |
| 10,362,721 B2 | 7/2019 | Hurd | |
| 2003/0154633 A1 | 8/2003 | Lassonde | |
| 2008/0245539 A1 | 10/2008 | Di Girolarno | |
| 2011/0297404 A1 | 12/2011 | Welch | |
| 2014/0262364 A1 * | 9/2014 | Townsend | A01B 29/00 |
| | | | 172/1 |
| 2016/0100516 A1 * | 4/2016 | Jordan | A01B 49/022 |
| | | | 172/146 |
| 2019/0082589 A1 * | 3/2019 | Litwiller | A01B 33/024 |
| 2019/0230839 A1 * | 8/2019 | Papke | A01B 33/087 |

* cited by examiner

GROUND ENGAGING TILLER WITH INVOLUTE PROFILE

CROSS-REFERENCE TO RELATED APPLICATION

This application claims the benefit of priority of U.S. provisional application No. 62/986,939, filed Mar. 9, 2020, the contents of which are herein incorporated by reference.

BACKGROUND OF THE INVENTION

The present invention relates to a ground engaging or tilling tool and, more particularly, to walking tillers having blades with an involute profile.

Ground tilling requires penetrating the ground, shearing the soil, and flipping or turning the soil over.

The best mode for tool ground penetration is at 90 degrees to the surface. Pulling by humans, animals such as oxen, and any other external power used in agriculture provides power input, allowing operation. Many rotary tilling systems use tillers or paddles without a defined baseline curve; the tiller profile follows the tiller penetrating path. However, when the tool rotates, the angle of penetration continuously changes, which leads to soil compression. Existing tiller tools waste energy compressing the soil instead of concentrating energy on penetration until tiller reaches maximum till depth.

As can be seen, there is a need for a more efficient rotary tilling system.

The invention provides an involute tiller system comprising a circular tool assembly including a drum and a plurality of radially mounted tiller blades or hoes with a specified involute profile, allowing the blades to penetrate the ground more efficiently than existing tillers. The inventive tiller system is based on a rack and pinion involute gear pair principle wherein a ratio of base drum radius (i.e., central rotating assembly radius) to the radial length of the tiller blade or tooth is about 1:1 or more. The inventive tiller system is analogous to a pinion while the ground is analogous to a stationary rack.

An involute curve is the shape traced by a point on a string as the string is unwound from a fixed base circle. An involute profile describes the curved contact surface of a gear tooth. The involute gear profile provides the most efficient contact surface for transmitting power, torque, and motion between gears smoothly and with minimum interference. Involute surface contact is typically a combination of simultaneous sliding and rolling. In the case of tilling, sliding, and rolling translates into slipping the tool blade to pierce and churn the soil. When a tool is based on the involute curve, soil penetration remains tangent to the curve. A tangent at the point of penetration closely represents and maintains 90 degrees penetration relative to the point and plane of penetration of the tool.

The inventive involute tilling system most closely approaches the effect of human ground tilling using a hoe. Humans using hoes account for almost 80% of food production in the developing world. The swing angle and radius for human hoe tilling is closely related to a base drum or circle. The metal hoe, as mounted in the handle, represents a tiller mounted on the base drum.

SUMMARY OF THE INVENTION

In one aspect of the present invention, a tilling apparatus is provided, comprising a central rotating assembly and a plurality of tiller blades attached circumferentially thereto, wherein the tiller blades have at least one surface characterized by an involute curve.

In another aspect of the present invention, a tilling apparatus is provided, comprising a central rotating assembly mounted longitudinally on a horizontal shaft and having a fillable cavity; a plurality of tiller blades configured in a plurality of circumferential rows, each tiller blade having at least one surface characterized by an involute curve; a hitch assembly; and a frame. A ratio of the central rotating assembly's radius to a radial length of the plurality of tiller blades is at least about 1:1.

These and other features, aspects and advantages of the present invention will become better understood with reference to the following drawings, description, and claims.

DETAILED DESCRIPTION OF THE INVENTION

Figure 1:
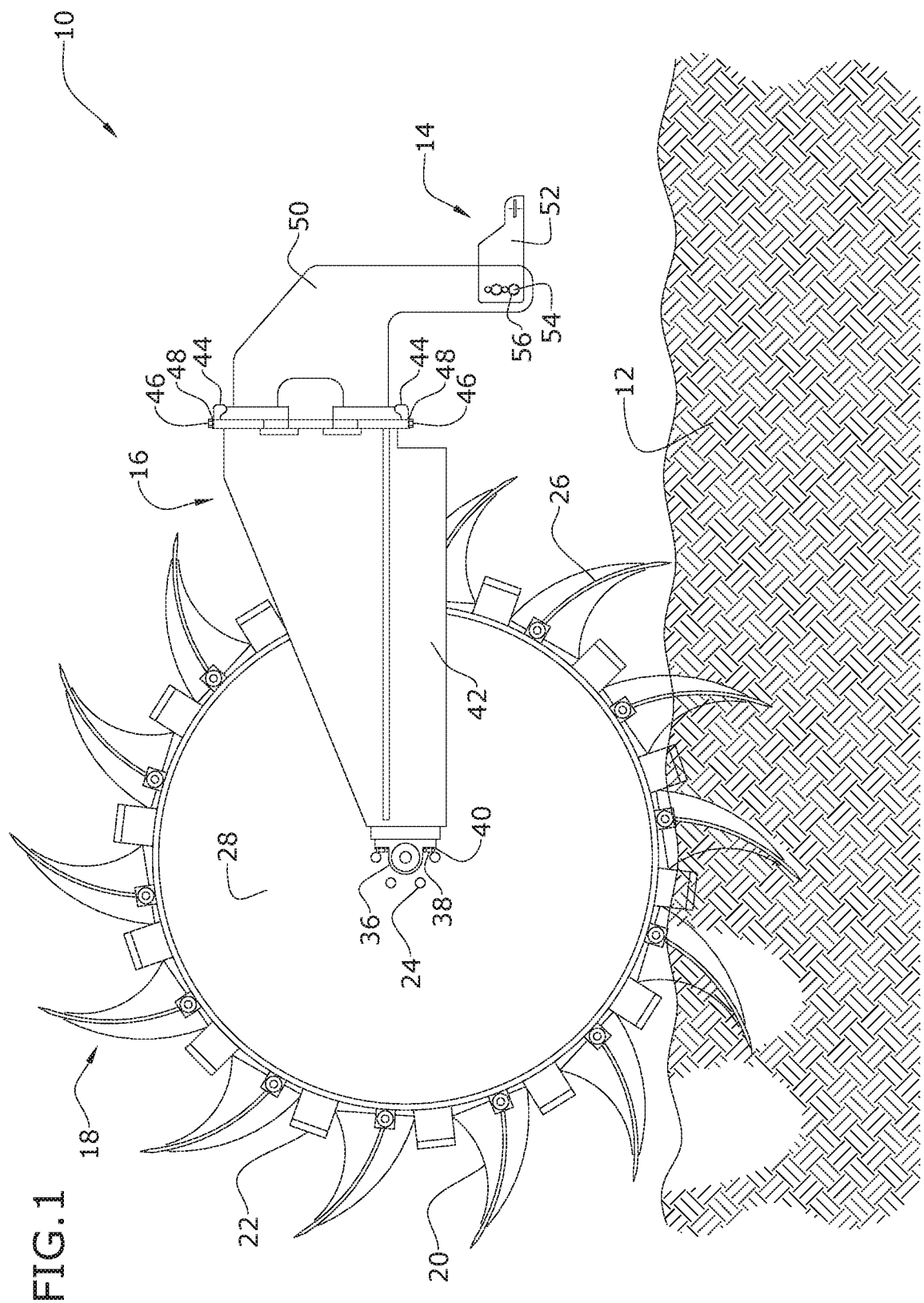
FIG. 1 is a side view of a single row involute tiller system according to one embodiment of the invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the term "involute" means having the form of a curve traced by a point on a thread kept taut as it is unwound from another curve.

Broadly, one embodiment of the present invention is a tiller comprising a central drum or rotating assembly with a plurality of blades attached circumferentially, the blades having at least one surface characterized by an involute curve.

Involute blade design efficiency and proportions are analogous to rack and pinion gear design. Without being bound by theory, the present invention minimizes force lost to soil compression and maximizes force translated to soil penetration and is believed to provide reduced wear and extended life as compared to conventional moldboard ploughs with multiple tillers and intermittent soil engagement.

During drum and tiller assembly rotation or walking of the tiller tool, force is generally concentrated on the penetrating leading edge until it reaches till depth. Since the inventive tiller profile follows the tip path or leading edge, there is little soil compaction. Soil disturbance may be minimized until after the tiller blade passes its maximum till depth. Past maximum depth, the tiller profile generally does not follow the tip path. The tiller blade shears and flips the soil towards the back, i.e., in the direction opposite the direction of pull. The pitch or working distance between the tiller blades determines the amount of ground tilling overlap.

Tillers ahead of the ones passing maximum till depth act as anchors for the ones beginning to shear and flip the soil. Because the soil behind the centerline of the base drum is already loose and the soil ahead of the centerline is still a solid bulkhead, any slip in the tool assists the ploughing function by sending tilled material backwards and sideways. Slip may also occur due to excess external power input. The relationship between the involute curve and base circle also means that there is a base drum circle radius below which a designated till depth may not be reached efficiently without the involute curve resulting in a backward soil scooping shape/curve, rendering the tiller incapable of penetrating the ground and/or requiring more power to carry tilled material. Blade mounting and orientation may be optimized so that the curve closely follows the tip of the tool for minimum soil disturbance during ground penetration. The involute profile maintains maximum penetrating force tangent to the blade curve.

When rolled or pulled in the direction of the external curve of the tillers, the involute profile of the tilling or ploughing blade guides and concentrates the tilling tool weight and power at the tip of the blade. The tiller or ploughing blades also provide ground anchoring and traction functions. The primary force for soil penetration is generally provided by pulling plus the weight of the tool, supplemented by any additional weight attached to the tool. Additional weight may be added to the tool to increase the penetration force needed to overcome higher soil resistance. Without being limiting, the present invention is intended to work at human and oxen walking speeds. As such, this tool can be referred to as a walking plough or tiller. The wide spectrum of powering options means the tool may also be pulled at greater speeds by an external power source as used in various agricultural cultivating operations. Towing power may be replaced or supplemented by a frame-mounted power source.

Tiller blades that are too long may result in a greater amount of soil displaced, requiring more power to carry displaced soil in a scooping format and to tow the tiller. A small base diameter with long involute tiller is more suited to narrow trenching functionality, requiring greater power and perhaps utilizing a reduction gearbox.

A ratio of the base drum or wheel radius to the maximum depth achieved by the tiller blade is defined as the effective tow force ratio. The tiller force is defined as the effective tow force ratio multiplied by the towing force. For example, given a base drum radius of 30" and a 14" maximum till depth, the effective tow force ratio is calculated as 2.14 (30/14=2.14). The tiller force in this example is 2.14× the towing force. Note that an increase in wheel diameter results in a reduced towing force.

In an embodiment, a ratio of the base drum radius to the radial length of the tiller blades or teeth may be at least about 1:1. Radial length of tiller is defined herein as the difference in the distance between the drum or wheel center to the tip of the tiller and the radius of the drum. In other words, it is the length of the tiller tip measured from its mounting base at the perimeter of the drum. For example, the base drum radius to tiller blade length be about 1:1, about 2:1, about 3:1, or a higher ratio, inclusive of ratios therebetween. A higher ratio means higher mechanical advantage for the towing force over the force at the tiller tip. Preferably, the radial length of the tiller blades maximizes the mechanical advantage of the tow force over the tiller tip force and minimizes the power lost to soil compression and lifting the tiller assembly above the ground. In some aspects of the invention, the length and penetration angle of the tiller blades may be adapted to one or more variables selected from the group consisting of: the intended depth of till, the soil resistance, the ground roughness, and the clearance of the base diameter of the tiller to prevent compaction of the ground surface.

While ploughing involves deep soil penetration and turnover, a tiller assembly equipped with shorter involute tillers or teeth may be used to loosen soil in preparation for secondary grading and leveling in construction generally, such as in road construction. This tiller system may be used in place of a single- or multi-tooth ripper attachment.

In an embodiment, the inventive tiller apparatus comprises a base drum with involute tillers (also referred to as blades or teeth) rigidly mounted thereupon. In some aspects of the invention, multiple circumferential rows of tillers may be assembled on a base drum to provide a wider tilling footprint. Width or overlap of the tillers may be adjusted to not leave untilled areas.

The base drum may be mounted longitudinally on a horizontal shaft. The tiller assembly may be supported on bearings mounted in a supporting frame. The frame may be attached to a hitch or hitch assembly. In some embodiments, the tiller assembly may be supported on pillow blocks. The hitch assembly height and size may be adjusted according to the tiller towing weight classification.

The tillers may be attached to the base drum or wheel by any suitable means, including but not limited to pins, clips, welding, bolts, washers and nuts, chain link pins, and sprockets. In some aspects of the invention, the tillers or tracks may be removably attached with, for example, pins and bolts so that the tillers or tracks may be replaced in case of damage or wear.

The inventive system may be used with a variety of tilling blades. The inventive tilling blades follow the involute curve or sweep to full till depth. Preferably, the blade is configured such that the tip emerges from the ground or soil with a downward slope, allowing soil to slide down to the ground. The tilling blade cross section may be modified to control or guide tilled material, such as directing soil to the back or side of the tiller. In the case of a "v" shaped ploughing blade (i.e., a blade having a "v" shaped cross-section), the soil may be directed to the left and/or right sides.

In an embodiment, the tilling blades may be track shoes with involute profile grousers, i.e., the protrusion on the track shoe which directly engages the ground. The grousers perform dual functions of tilling and traction. This arrangement allows for a continuous track chain complete with tillers wrapped around a sprocket for easy assembly and mounting in a similar method to installation of track chains on tracked machines, such as a track loader, excavator, or tractor. Bolting allows for individual tracks to be replaced in case of damage or wear. A grouser with an involute profile may be used to prepare soil for grading or for any other secondary soil conditioning, including construction.

The tiller blade profile and the till depth may be selected as a function of the diameter of the base drum. The number of tiller blades may be selected as a function of tilling overlap or chain pitch for a given tilling depth. Tiller arrangement and spacing may be selected to allow for minimum material carried or scooped as the tillers emerge from the ground.

Generally, the tilling blades are characterized by at least a minimum thickness. In some embodiments, the blades may be reinforced with cross gussets to maintain structural strength and/or surface hardening to increase strength and reduce wear.

The blades may be attached to a fillable drum. The drum cavity may be filled with a fluid or sand filler to provide additional weight. The amount of filler may be adjusted to optimize performance and to accommodate the towing method. Preferably, the drum is airtight.

If the tiller assembly does not have sufficient weight to penetrate the soil, the tilling assembly and support frame may incorporate a drive to direct additional vibratory impact penetrating force to the tip of each tiller. The vibratory impact drive input facilitates additional benefits of breaking up the soil. The vibratory impact drive may extend the operational capability and application spectrum of the tiller system.

In an embodiment, an integral vibratory impact drive may comprise two rotating, off-center weights driven by a small balanced power device. In some aspects of the invention, the weights may be mounted 180 degrees apart. The power device may be directly connected to a drive gear or sprocket, which simultaneously drives the base drum and connected tillers through a controlled clutch. The clutch may regulate the amount of impact or supplemental power input. As the weights rotate, their centrifugal forces may add or subtract from the driving torque depending on their synchronized rotation angle positions. The drive system may provide varying speeds, forces, impact frequency and weights to refine and match desired operational performance. Additional pairs of weights may be added. The centrifugal force generated by rotation of each weight may be calculated by the equation $F=mv^2/r$ (force=mass×velocity$^2$/radius). The forces combine to provide a vibration or cumulative force intermittently at the tip of the tilling blade. The vibration may ease soil penetration while assisting in soil break up. The vibration frequency may be controlled by drive ratios and primary drive system speed variation.

Figure 2:
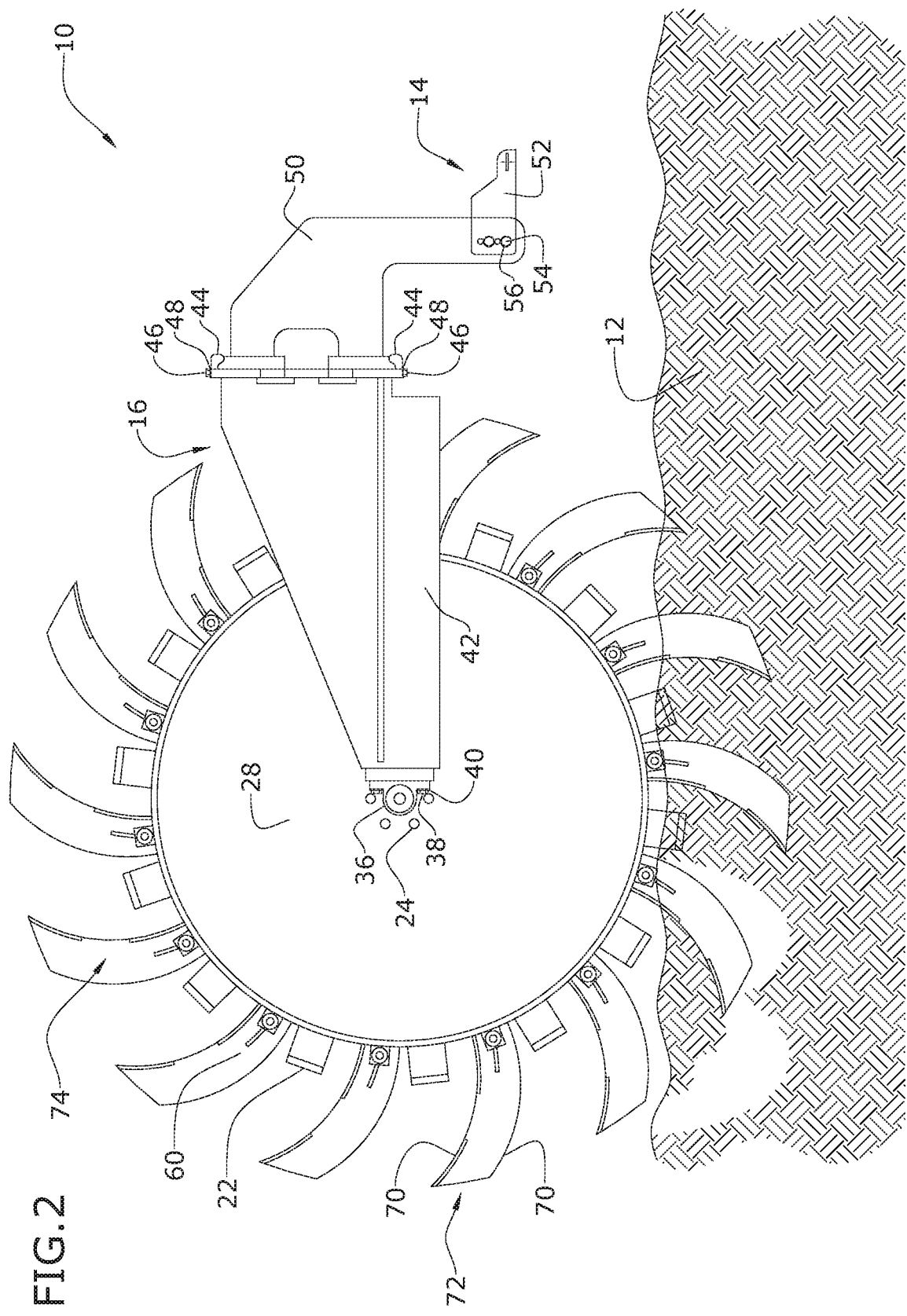
FIG. 2 is a side view of a single row involute ploughing tiller system according to another embodiment of the invention.
Figure 3:
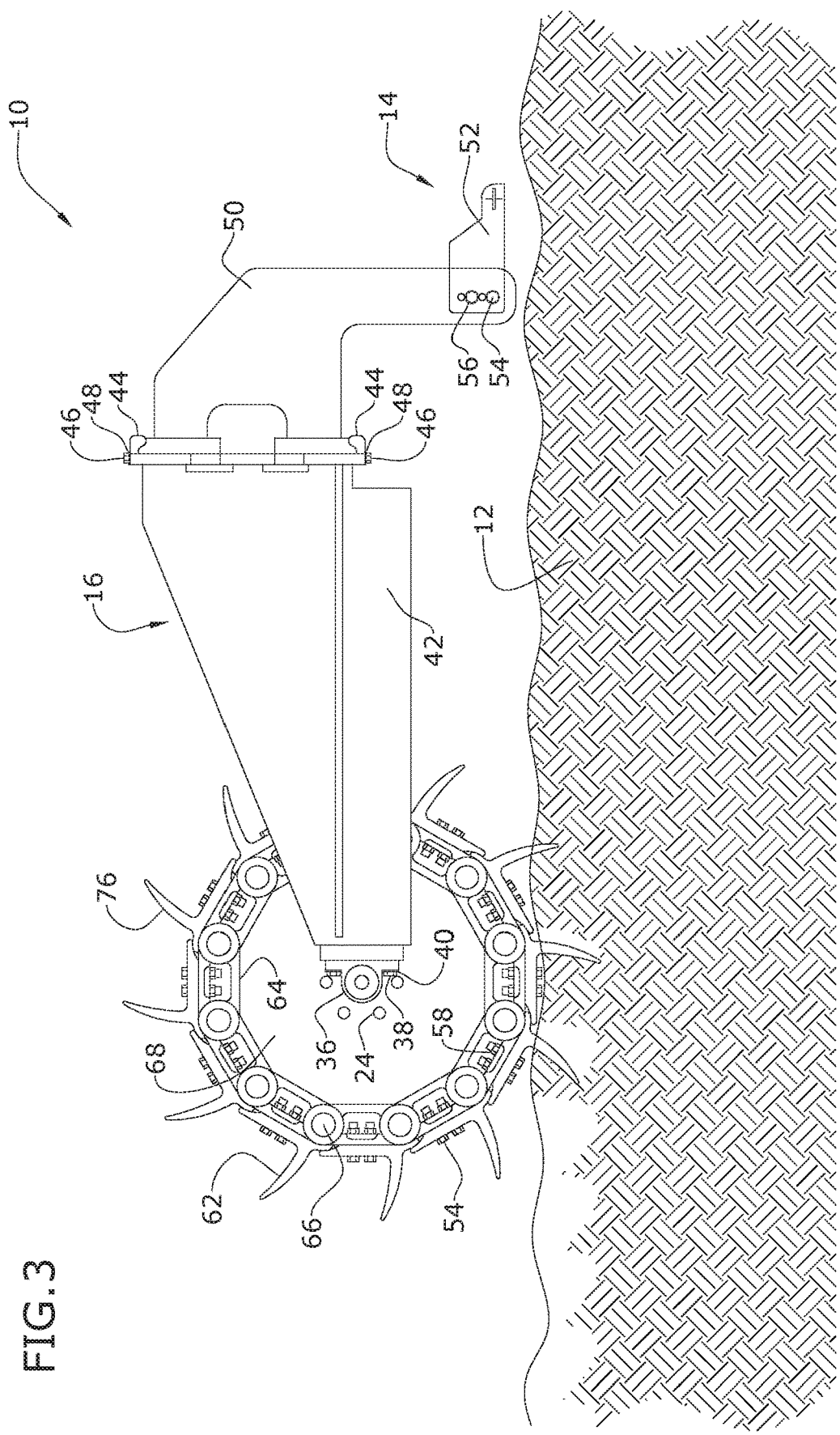
FIG. 3 is a side view of an involute track shoe (incorporating an involute grouser) tiller system according to yet another embodiment of the invention.
Figure 4:
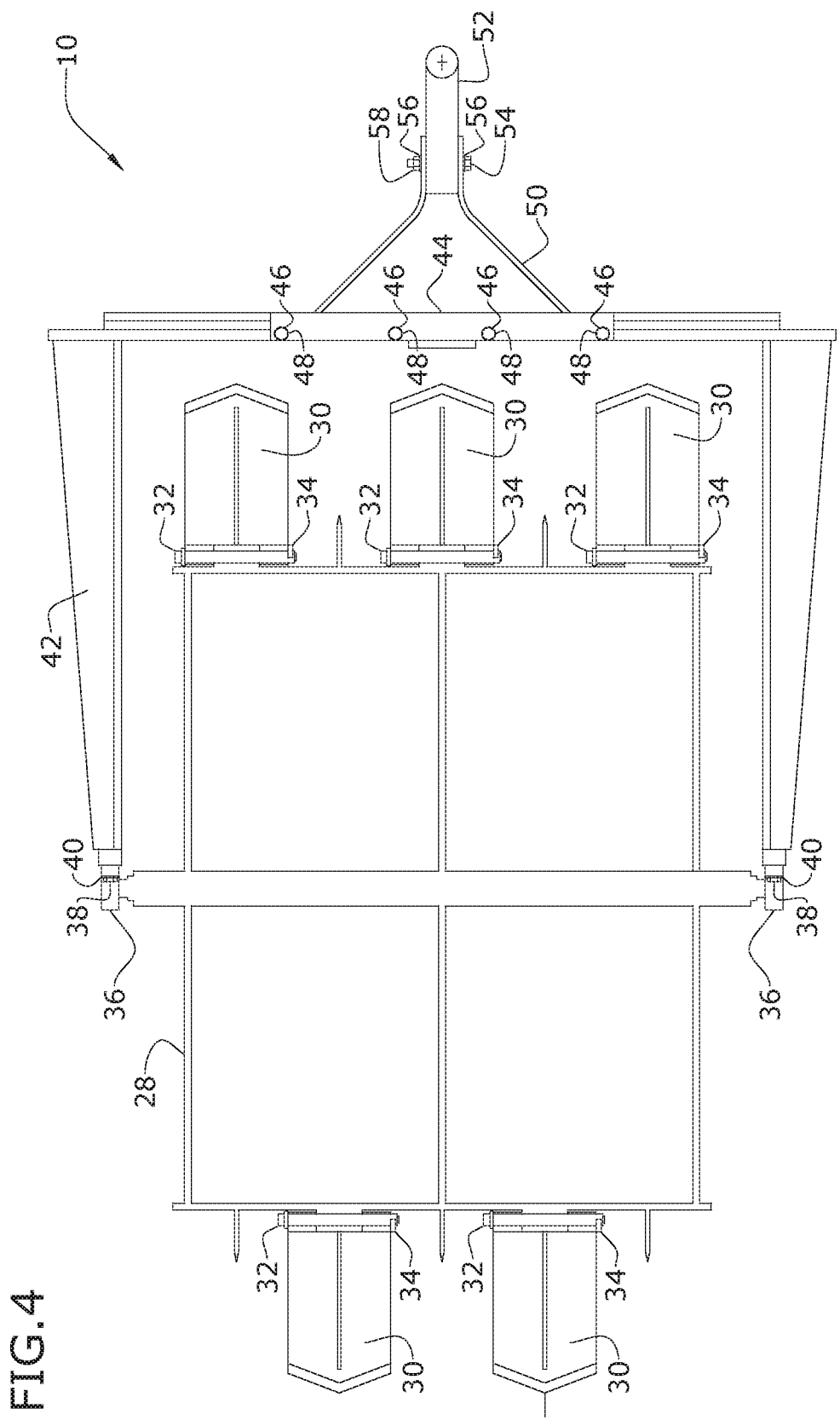
FIG. 4 is a top view of a tiller assembly including multiple inventive tiller blades according to FIG. 1, 2, or 3; a support frame; and a tow hitch.

Referring to FIGS. 1-4, tiller assemblies are illustrated with three different blade embodiments. Turning first to FIG. 1, the involute tiller assembly 10 wheel comprises a circular structure 22 on which multiple tillers or teeth 26 are generally mounted radially. The tiller blades 18 may be configured with a cross-section effective to displace most of the soil backwards when the tiller assembly 10 is pulled forward across the ground 12. Each blade 18 has a blade-reinforcing gusset 20. The number of tillers 26 depends upon desired tilling overlap for a given tilling depth. The drum 28, which incorporates a cross shaft as shown in FIG. 4, and tiller 26 are mounted on the tiller support 42 by a fastening system comprising pillow block bearing 36, bolt 38, and washer 40. The drum 28, tiller 26 and support frame 42 are attached to a sub frame 50 (together referred to as tiller support assembly 16) and tow hitch 52 (together referred to as tow/pull hitch assembly 14) for pulling/towing across ground 12. Sub frame 50 may be attached to support frame 42 using two upper and lower hitch mounting bars 44 and fasteners 46, 48. Sub frame 50 may be secured to hitch 52 with bolt 54, nut 58 and washer 56. The support frame 42 may be secured to sub frame 50 with hitch mounting bar 44, bolt 46, and washer 48. These fasteners 46, 48 allow the support frame 42, drum 28, and tiller 26, sideways adjustability to allow tilling/ploughing over wheel tracks left by the towing device. Adjustment allows precise side shift relocation of tillers similar to forklift side shift feature mechanisms. As used herein, this feature is referred to as sideways tool mounting adjustability.

The tiller assembly of FIG. 2 illustrates another embodiment of the invention which utilizes blades, tillers, or teeth 72 designed primarily for displacing soil sideways as in field ploughing. Plowing blades 72 have an involute profile section 74 with reinforcement 60 and exhibit an involute curve or sweep 70. The involute tiller assembly 10 wheel comprises a circular structure 22 on which multiple tillers or teeth 72 may be mounted radially. Individual tillers 72 may be replaced in case of damage or wear. The number of tillers 72 depends upon desired tilling overlap or chain pitch for a given tilling depth.

The tiller assembly of FIG. 3 illustrates yet another embodiment of the present invention which utilizes track shoes 62 with involute profile grousers 76, i.e., the protrusion on the track shoe 62 which directly engages the ground 12. Track shoe 62 with involute grouser 76 may be bolted to track link 64 using bolt 54, washer 56, and nut 58. Track links 64 may be connected by chain link pin 66 around sprocket 68 which may drive the track chain.

While FIGS. 1-2 illustrate the tillers attached to the structure 22 using pins 32 and clips 34 as illustrated in FIG. 4, many other attachment means may be used, including welding. Pinning allows individual tillers or tracks to be replaced in case of damage or wear. In some cases, the drum 28 may be airtight to allow filling with a fluid or other viscous material to increase the weight during tilling and to allow emptying the drum 28 to reduce weight during transportation.

FIG. 4 illustrates a complete multiple tiller assembly, comprising involute tiller assemblies 30 secured to base drum 28 with pin 32 and retainer clip 34; support frame 42; and hitch 52. To till or plough a wider path, multiple rows of tillers 26 may be mounted side by side such that the tiller 26 rows cover the desired tilling width. Width or overlap of the tillers may be adjusted so as not to leave untilled areas. The tillers 26 generally are rigidly attached to the base drum 28 or rotating assembly to maintain the involute soil penetrating profile.

If the tiller assembly 10 does not have sufficient weight to penetrate the soil, the tilling assembly 10 and support frame 42 may further comprise a drive system to direct additional vibratory impact penetrating force to the tip of each tiller. The vibratory impact drive also improves break-up of the soil.

It should be understood, of course, that the foregoing relates to exemplary embodiments of the invention and that modifications may be made without departing from the spirit and scope of the invention as set forth in the following claims.

What is claimed is:

1. A ploughing apparatus, comprising a central rotating assembly and a plurality of tiller blades attached circumferentially thereto, wherein the tiller blades have at least one surface characterized by an involute curve with respect to the central rotating assembly and wherein the tiller blades curve in a clockwise direction when viewed along a longitudinal axis of the central rotating assembly with a forward direction to the right;
wherein the central rotating assembly, the plurality of tiller blades, or the central rotating assembly and the plurality of tiller blades are effective to intermittently direct additional penetrating force to a tip of at least one of the plurality of tiller blades.

2. The ploughing apparatus of claim 1, wherein the plurality of tiller blades is characterized by a cross-section effective to displace most soil backwards during use.

3. The ploughing apparatus of claim 1, wherein the plurality of tiller blades are ploughing blades with a "v" shaped cross-section.

4. The ploughing apparatus of claim 1, wherein the plurality of tiller blades are track shoes with grousers characterized by an involute curve.

5. The ploughing apparatus of claim 1, wherein a ratio of the central rotating assembly's radius to a radial length of the plurality of tiller blades is at least about 1:1.

6. The ploughing apparatus of claim 1, wherein the plurality of tiller blades are configured in a plurality of circumferential rows.

7. The ploughing apparatus of claim 1, wherein the central rotating assembly is mounted longitudinally on a horizontal shaft.

8. The ploughing apparatus of claim 1, wherein the central rotating assembly is attached to a hitch assembly by way of a frame.

9. The ploughing apparatus of claim 1, wherein the central rotating assembly has an airtight fillable cavity.

10. The ploughing apparatus of claim 1, wherein the central rotating assembly is effective to intermittently direct additional penetrating force to a tip of at least one of the plurality of tiller blades.

11. The ploughing apparatus of claim 3, wherein the plurality of tiller blades is characterized by a cross-section operative to displace most soil backwards and sideways during use.

12. The ploughing apparatus of claim 10, wherein the central rotating assembly is effective to intermittently direct additional penetrating force twice within a rotation thereof.

13. The ploughing apparatus of claim 12, wherein the additional penetrating force is directed to the tip of two of the plurality of tiller blades mounted 180° apart.

* * * * *